(12) United States Patent
Cress

(10) Patent No.: US 9,032,839 B2
(45) Date of Patent: May 19, 2015

(54) CRANKSHAFT UNDERCUT FILLET

(71) Applicant: Caterpillar Inc., Peoria, IL (US)

(72) Inventor: James Jay Cress, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/927,739

(22) Filed: Jun. 26, 2013

(65) Prior Publication Data

US 2015/0000461 A1    Jan. 1, 2015

(51) Int. Cl.
*F16C 3/04* (2006.01)
*B23P 17/00* (2006.01)
*F16C 3/06* (2006.01)
*B23C 3/06* (2006.01)

(52) U.S. Cl.
CPC .... *F16C 3/06* (2013.01); *B23C 3/06* (2013.01)

(58) Field of Classification Search
USPC ............... 74/579 E, 595–605; 29/6.01, 557, 29/888.08; 123/197.4; 451/49
See application file for complete search history.

(56) References Cited

U.S. PATENT DOCUMENTS

| | | | |
|---|---|---|---|
| 5,009,001 A | 4/1991 | Deschler | |
| 6,393,885 B1 * | 5/2002 | Cadena | 72/110 |
| 7,594,799 B2 | 9/2009 | Miller et al. | |
| 8,011,096 B2 * | 9/2011 | Reeb et al. | 29/888.08 |
| 8,136,508 B2 | 3/2012 | Eddy | |
| 8,647,176 B2 * | 2/2014 | Schmitz | 451/63 |
| 8,757,028 B2 * | 6/2014 | Broughton et al. | 74/603 |
| 8,826,773 B2 * | 9/2014 | Walters | 74/603 |
| 2009/0307886 A1 | 12/2009 | Chiba et al. | |

FOREIGN PATENT DOCUMENTS

| | | |
|---|---|---|
| DE | 19916492 A1 | 4/1999 |
| DE | 10328453 A1 | 1/2005 |
| JP | 63068325 A | 3/1988 |

OTHER PUBLICATIONS

Obtained machine translation of DE 19916492 A1 on Sep. 15, 2014.*

* cited by examiner

*Primary Examiner* — Thomas R. Hannon
*Assistant Examiner* — Adam D Rogers
(74) *Attorney, Agent, or Firm* — Miller, Matthias & Hull LLP

(57) ABSTRACT

A crankshaft and method for manufacturing the same are disclosed. The crankshaft may comprise a web and a rod journal disposed adjacent to the web. The rod journal includes a fillet disposed proximal to the web. The fillet includes a tapered undercut having a concave shape with a graduated depth. The undercut is defined by a sweep angle and an offset angle.

11 Claims, 6 Drawing Sheets

CRANKSHAFT UNDERCUT FILLET

TECHNICAL FIELD

The present disclosure generally relates to fillets for crankshafts and, more particularly, relates to fillets utilized with crankshafts on engines.

BACKGROUND

As engines and applications have evolved, there has been a need for reducing the size of engines while at the same time increasing the power output available from those engines. When the engine size is reduced, the size of the engine crankshaft is reduced as well. As a result there is less space available for bearings and for stress reducing features such as fillets. To accommodate a shorter crankshaft, undercut fillets that entirely encircle the rod journal have been used. While this may produce the desired reduction in stress on the crankshaft, it may also decrease the stiffness of the crankshaft from that which is desired in the application.

German Patent No. 11916492A1 ("Duetz") discloses an example of a crankshaft. FIG. 2 discloses a cross-section of a portion of a crankshaft. The crankshaft includes a shaft journal (2), a web (4) and a crank pin (3). To relieve stress, the web (4) has at least one groove cut into it. In one embodiment, the groove is cut on either side of the web (4) cheek at a spaced apart distance from the transition region or fillet region 5, 6 of the crankshaft. The groove, as shown in FIG. 3, may be arc shaped. This design does not disclose an undercut disposed at an offset angle.

SUMMARY OF THE DISCLOSURE

In accordance with one aspect of the disclosure, a crankshaft is disclosed. The crankshaft may comprise a web and a rod journal disposed adjacent to the web. The rod journal may include a fillet disposed proximal to the web. The fillet may include a tapered undercut having a concave shape with a graduated depth. The undercut is defined by a sweep angle and an offset angle. In an embodiment, the offset angle may be in the range of about 10 degrees to about 30 degrees.

In accordance with another aspect of the disclosure, a crankshaft rotatably mounted about an X-axis in an engine is disclosed. The crankshaft may comprise a web, and a rod journal disposed adjacent to the web and configured to orbit the X-axis. The rod journal may have a centerline that is parallel to and spaced apart from the X-axis. The rod journal may include a fillet disposed near the web. The fillet may include a tapered undercut having a concave shape with a graduated depth. The undercut is defined by a sweep angle and an offset angle. In one embodiment, the sweep angle may be in the range of about 50 degrees to about 130 degrees, and the offset angle may be in the range of about 10 degrees to about 30 degrees.

In accordance with a further aspect of the disclosure, a method of method of manufacturing a crankshaft is disclosed. The crankshaft may include a web adjacent to a rod journal. The rod journal may include a fillet. The method may comprise positioning a circular milling tool on the fillet, and creating in the fillet a concave undercut with graduated depth by using a circular milling tool to remove material from the fillet while rotating the circular milling tool around an offset angle as the circular milling tool moves across a sweep angle.

DETAILED DESCRIPTION

Figure 1:
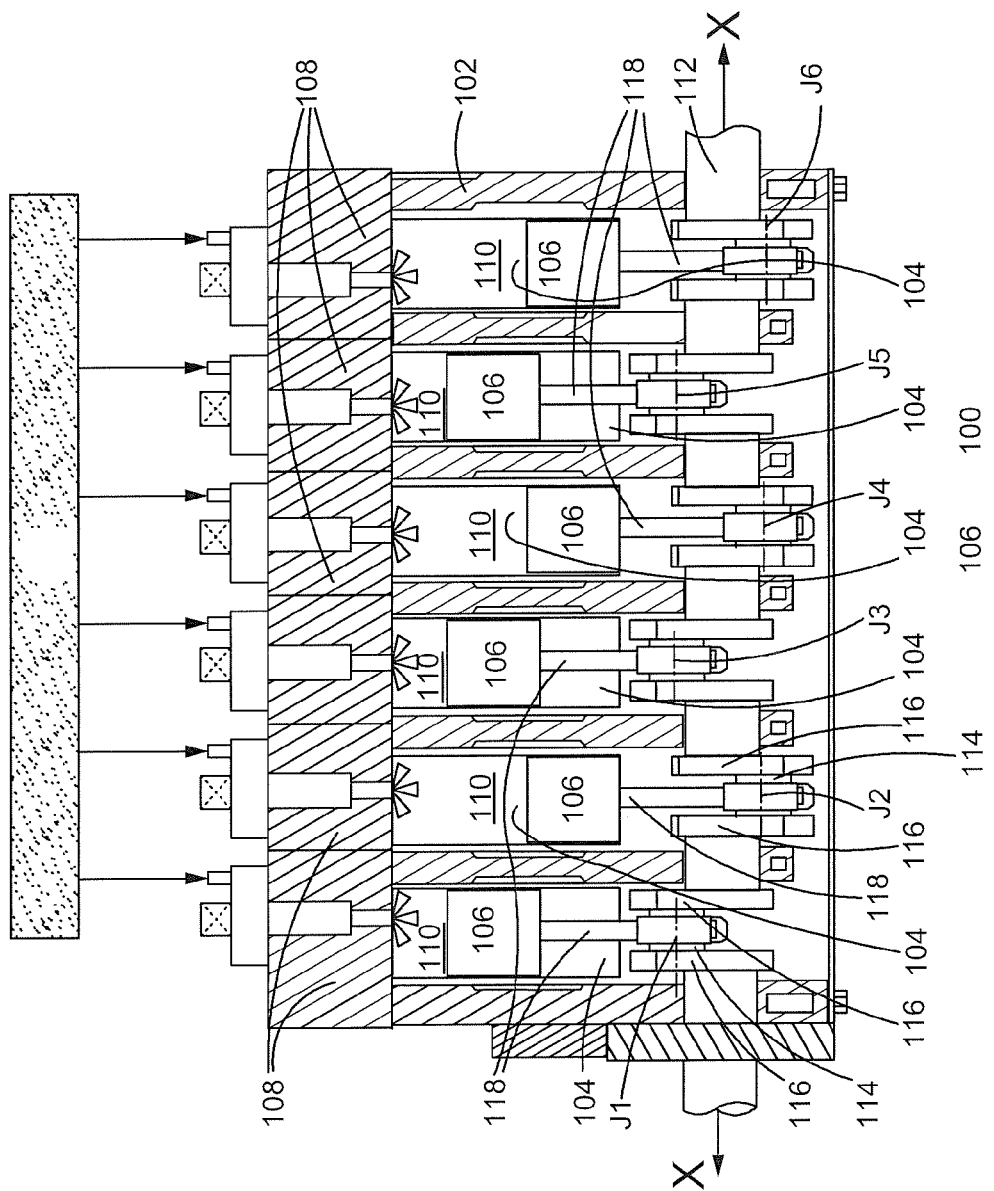
FIG. 1 is a schematic cross section of an exemplary engine having an exemplary crankshaft constructed in accordance with the teachings of this disclosure.

FIG. 1 illustrates one example of an engine 100 that incorporates the features of the present disclosure. While the description and drawings are made with reference to a crankshaft on an engine 100 utilized in a common rail fuel system, the teachings of this disclosure may be employed on crankshafts in engines 100 with other types of fuel systems in which it is desired to reduce stress while maintaining stiffness of the crankshaft. Further, the teachings of this disclosure may be utilized in other applications in which it is desired to reduce stress while maintaining stiffness of a component in an assembly such as a crankshaft, camshaft, or the like.

The engine 100 may include an engine block 102 that at least partially defines a plurality of cylinders 104. A piston 106 may be slidably disposed within each cylinder 104, and the engine 100 may also include a cylinder head 108 associated with each cylinder 104. Cylinder 104, piston 106, and cylinder head 108 may together form a combustion chamber 110.

Engine 100 may include a crankshaft 112 that is rotatably mounted in the engine block 102. The crankshaft 112 is centered on and rotates about an X-axis as shown in FIG. 1. The crankshaft 112 includes one or more spaced apart rod journals 114 sandwiched between a pair of webs 116. The webs 116 also rotate about the X-axis. Each rod journal 114 is centered on a rod journal centerline J (J1-J6, respectively in FIG. 1). Each centerline J is spaced apart from and generally parallel to the X-axis. Each rod journal 114 orbits about the X-axis of the crankshaft 112.

A connecting rod 118 connects each piston 106 to a rod journal 114 so that the sliding motion of the pistons 106 within their respective cylinders 104 results in a rotation of the associated rod journals 114 and crankshaft 112. Similarly, a rotation of crankshaft 112 may result in a sliding motion of pistons 106.

The combustion of an air-fuel mixture in the combustion chamber 110 may generate a force on piston 106 that travels through connecting rod 118 to crankshaft 112. Stress reducing features seek to reduce the stress on the crankshaft 112 produced by this force, and the like.

Figure 2:
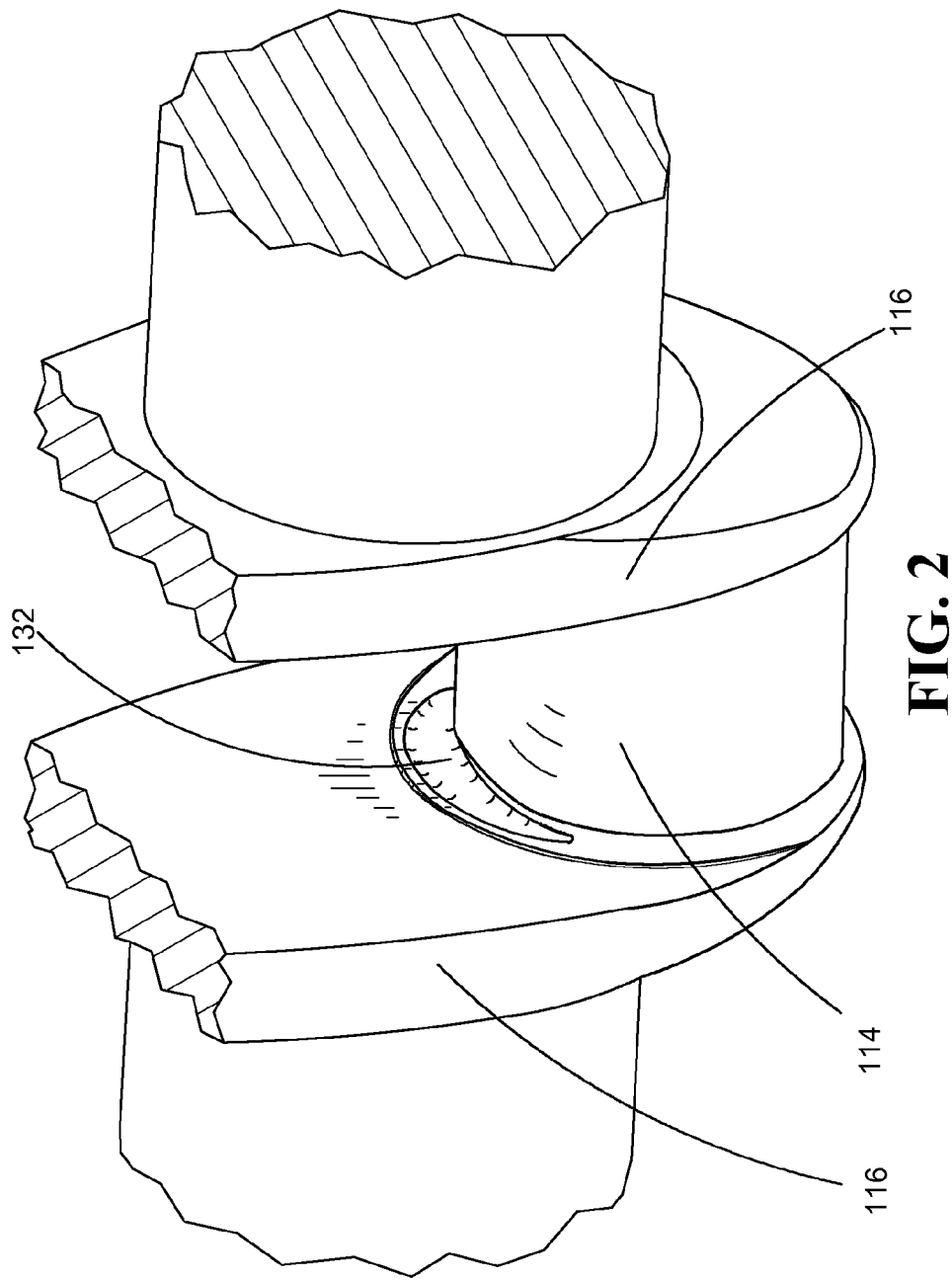
FIG. 2 is an enlarged perspective view of a portion of the crankshaft of FIG. 1.

FIG. 2 illustrates an enlarged perspective view of a portion of the crankshaft of FIG. 1, namely a rod journal 114 adjacent to a web 116. For discussion purposes, the connecting rod 118 that can be seen in FIG. 1 is not shown as attached to the rod journal 114 in FIG. 2. As can be best seen in FIG. 3, the rod journal 114 includes a fillet 128 disposed around the base 130 of the rod journal 114 proximal to where the rod journal 114 transitions to the web 116. The fillet 128 may be thought of as a rounding of the intersection between the rod journal 114 and the web 116. In one embodiment, the fillet 128 may fully encircle the rod journal 114. The fillet 128 includes an undercut 132. The undercut 132 is a concave, arc shape and may be defined by a sweep angle and an offset angle.

Figure 3:
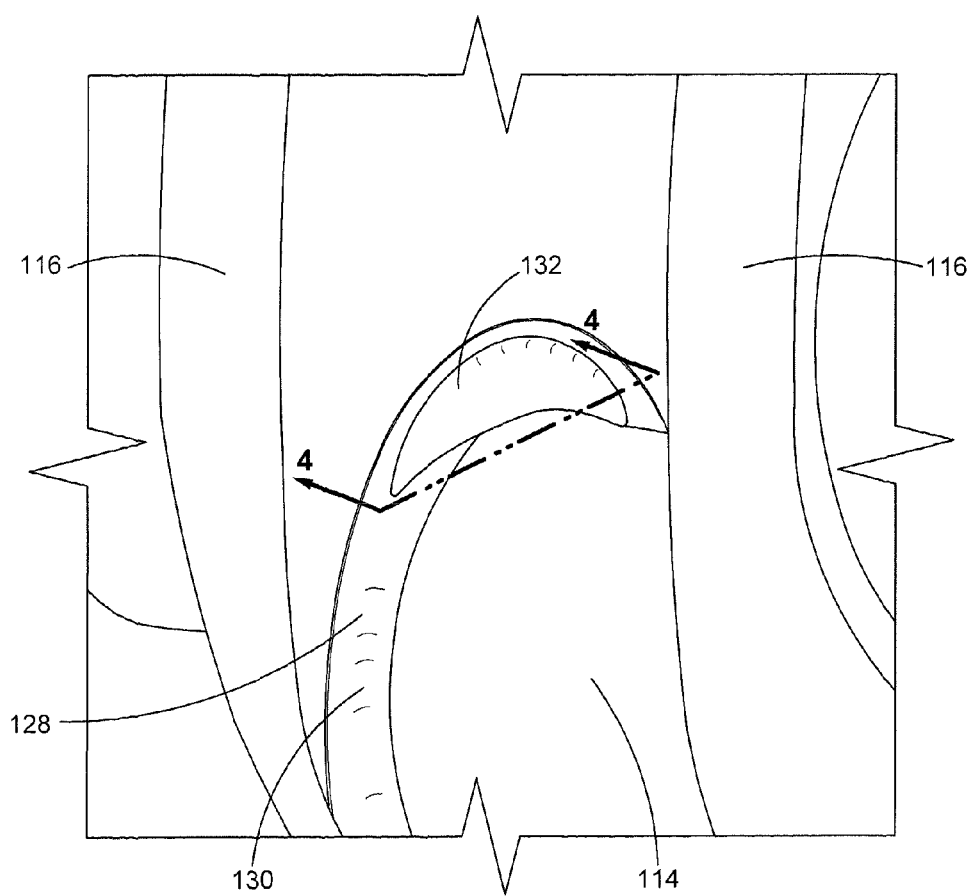
FIG. 3 is another enlarged perspective view of a portion of the crankshaft of FIG. 1.
Figure 4:
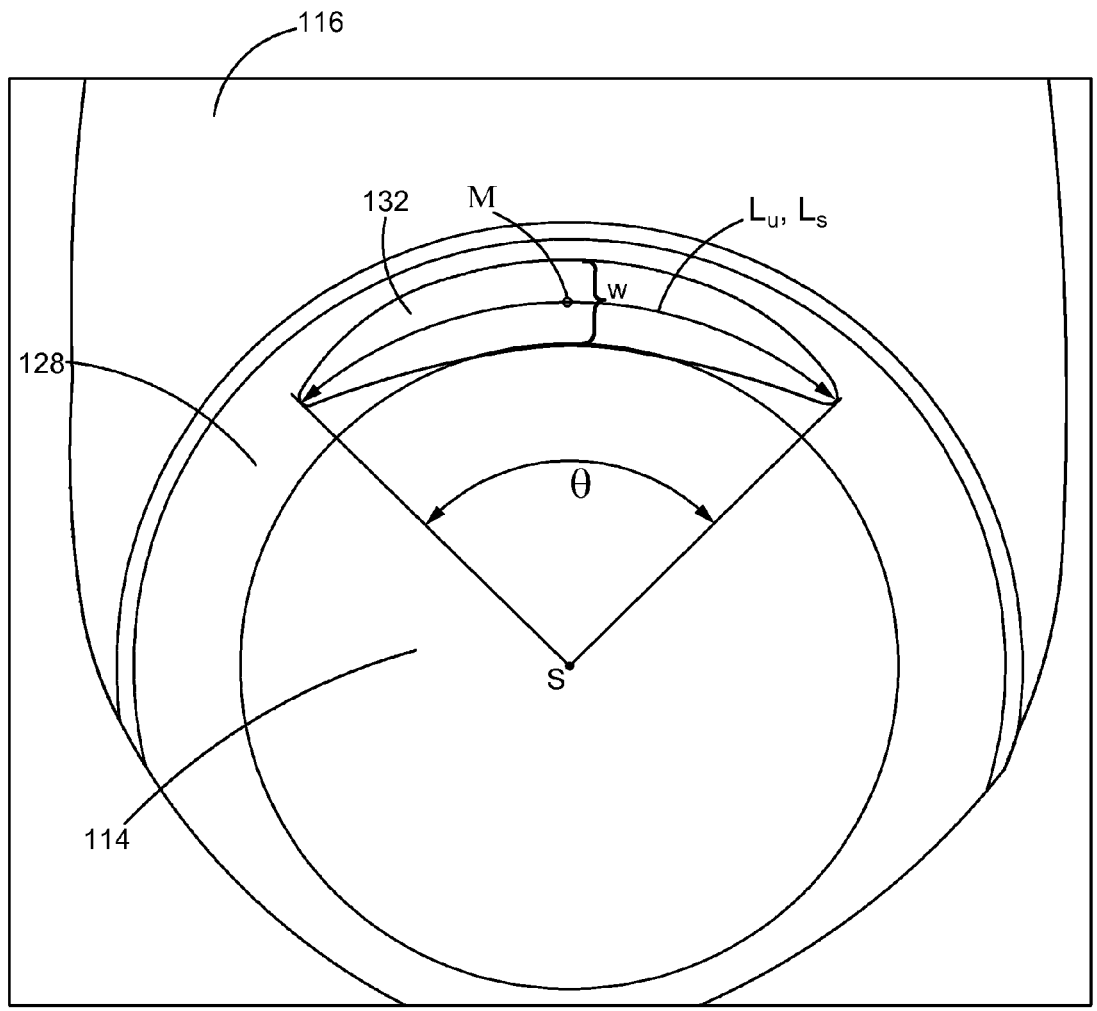
FIG. 4 is a perspective view of the portion of the crankshaft illustrated in FIG. 3 taken along the lines 4-4.

FIG. 4 illustrates a perspective view of the portion of the crankshaft 112 illustrated in FIG. 3 taken along the lines 4-4. FIG. 4 illustrates an exemplary sweep angle θ. The vertex S of the sweep angle θ is disposed on the centerline J of the rod journal 114. Being defined by a sweep angle means, for the purpose of this disclosure, that the arc length of the undercut $L_U$ extends about the arc length of the sweep angle $L_S$ (at the same location) and does not extend substantially beyond the arc length of the sweep angle $L_S$. In one exemplary embodiment, the sweep angle θ may be in the range of about 50 degrees to about 130 degrees. In another embodiment, the sweep angle θ may be in the range of about 80 degrees to about 100 degrees. In yet another embodiment, the sweep angle θ may be about 90 degrees, plus or minus ten percent. In other embodiments, other sweep angles than those mentioned above may be used.

Figure 5:
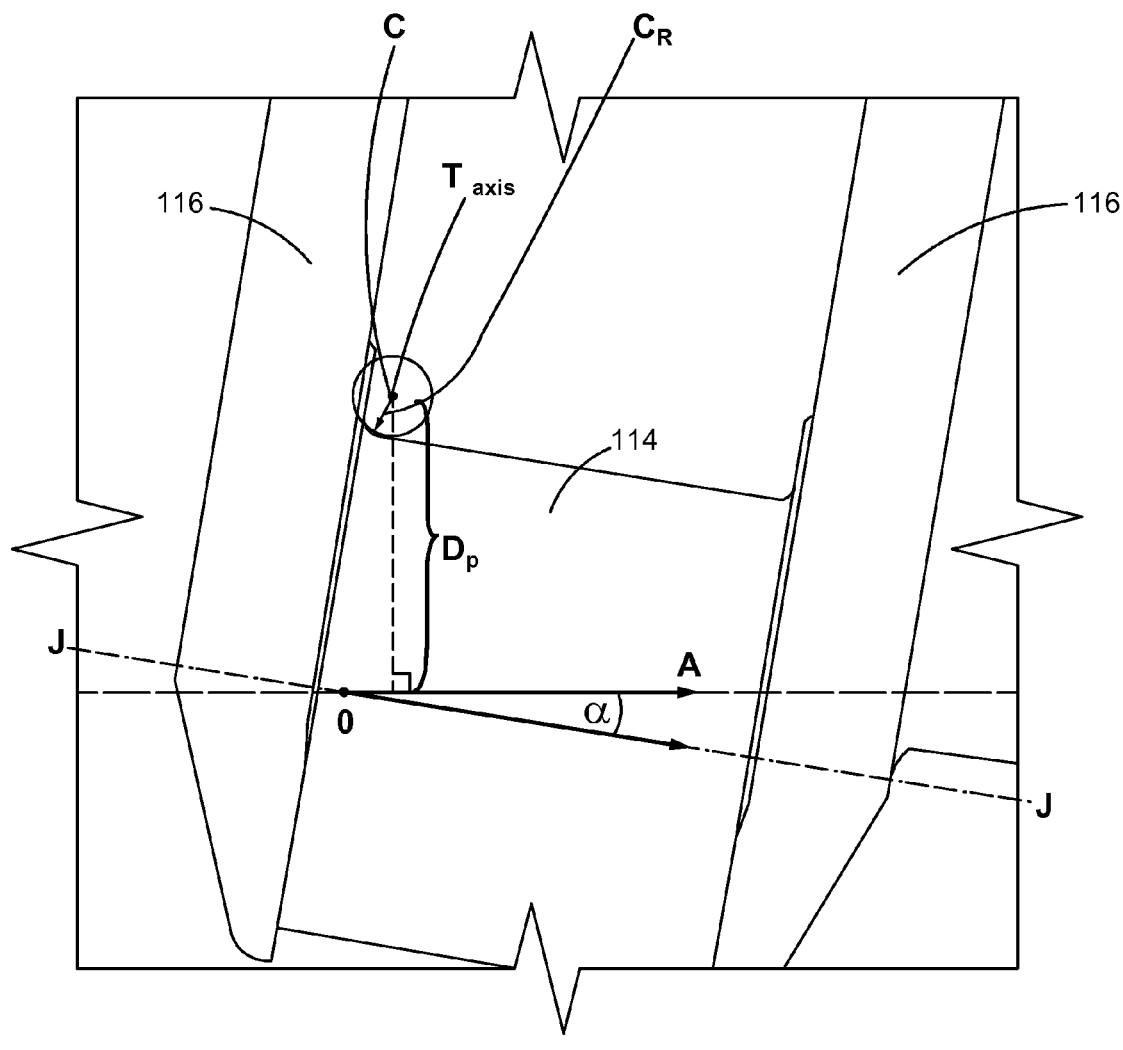
FIG. 5 is another perspective view of the portion of the crankshaft shown in FIG. 3 before the undercut has been created in the fillet.

FIG. 5 is another perspective view of the portion of the crankshaft 112 shown in FIG. 3 before the undercut 132 has been created in the fillet 128. The undercut's 132 concave shape may be created with a circular cutting or milling tool (collectively, "circular milling tool") configured to make a concave, generally circular cut. An example of such a tool, as is known in the art, is a milling wheel, or the like, that spins about a T-axis as it mills or removes material and creates a generally concave and rounded or, at least partially, circular undercut 132. The cutting radius $C_R$ is the radius of the circular milling tool, such as a milling wheel, as measured from the T-axis about which it rotates. FIG. 5 illustrates an exemplary cutting radius $C_R$ with its vertex C on the T-axis.

As the circular milling tool moves through the sweep angle θ around the rod journal 114, the depth of the undercut 132 created by the circular milling tool changes. As may be best seen in FIG. 4, the undercut 132 has a graduated depth both along the arc length $L_U$ of the undercut and the width W of the undercut 132. Its deepest point along the arc length $L_U$ of the undercut generally occurs at or about the mid-point M of the arc length $L_U$ and its most shallow points along the arc length $L_U$ at either ends of the arc length $L_U$. In addition, the width W across the undercut 132 is widest as the mid-point M and tapers gradually toward each end of the arc length $L_U$. It is believed that the shape and location of the undercut 132 provides appropriate stress relief while helping to maintain the strength of the crankshaft 112. To provide this tapered and generally rounded concave shape with graduated depth for the undercut 132, the circular milling tool, having a cutting radius $C_R$, is revolved through the arc length $L_S$ of the sweep angle θ at an offset angle α to the rod journal centerline J.

As can be seen in FIG. 5 the offset angle α has a vertex O, a base ray B and an offset ray A. The vertex O is disposed on rod journal centerline J. The base ray B extends out from the vertex O along the rod journal centerline J. While removing material from the fillet 128, the perpendicular distance $D_P$ between the vertex C of the cutting radius $C_R$ of the circular milling tool and the offset ray A of the offset angle α is held constant as the circular milling tool is revolved around the offset ray A and the undercut 132 is created in the fillet 128. This concept is diagrammatically illustrated in FIG. 6.

Figure 6:
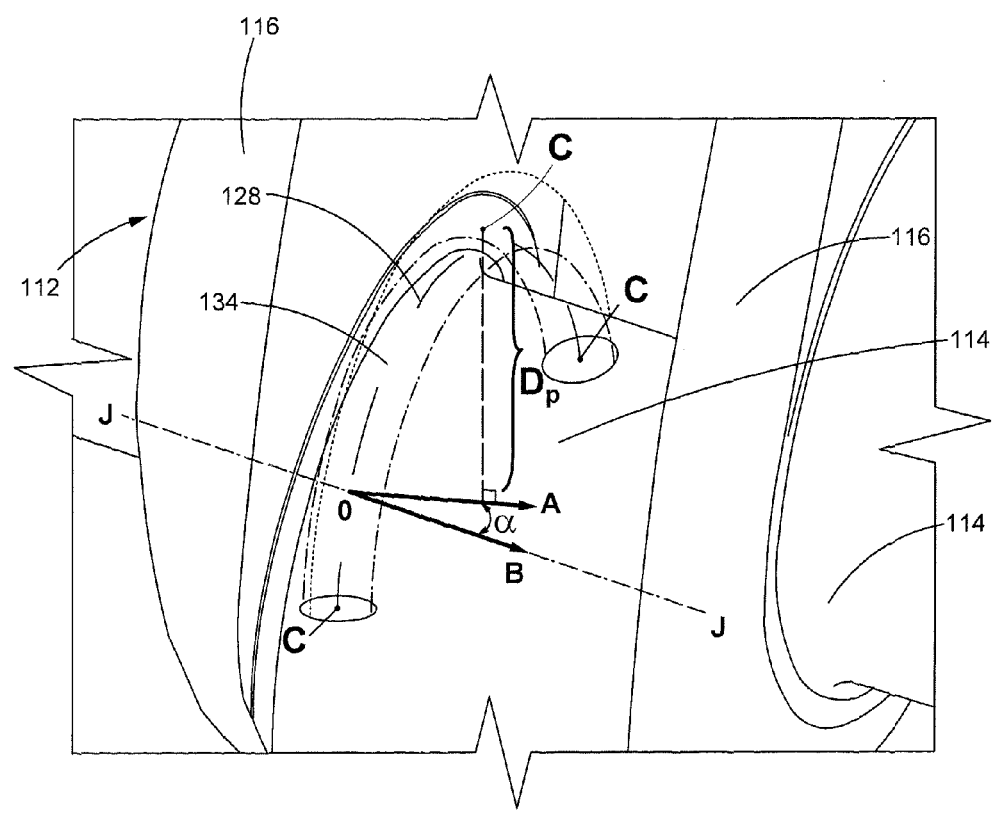
FIG. 6 is another perspective view of the portion of the crankshaft shown in FIG. 3 before the undercut has been made.

FIG. 6 is another perspective view of the portion of the crankshaft 112 shown in FIG. 3 before the undercut 132 has been made. FIG. 6 illustrates a toroidal-like cutting path 134 of a circular milling tool overlayed on top of a crankshaft rod journal 116 and fillet 128 before the undercut 132 has been made. The cutting path 134 appears to be tilted at an angle because of the perpendicular relationship of the vertex C of the cutting radius $C_R$ to the offset ray A seen in FIG. 5. In some embodiments, the undercut 132 may extend past the rod journal fillet 128 and into the web 116. In other embodiments, the undercut 132 may only be in the rod journal fillet 128 and does not extend into the web 116; in such a case, the undercut 132 is considered to be "confined" to the rod journal fillet 128. In an embodiment, the offset angle α may be in the range of about 10 degrees to about 30 degrees. In another embodiment, the offset angle α may be in the range of about 15 degrees to about 25 degrees. In yet another embodiment, the offset angle α may be about 15 degrees, about being viewed as plus or minus 10 percent. In other embodiments, other offset angles than those mentioned above may be used.

INDUSTRIAL APPLICABILITY

The present disclosure may find applicability in providing stress reduction in areas of high stress on the crankshaft while still providing the desire amount of stiffness in the crankshaft for an application.

Disclosed is a method of method of manufacturing a crankshaft. The crankshaft includes a web adjacent to a rod journal. The rod journal includes a fillet proximal to the web. The method comprises positioning a circular milling tool on the fillet, and creating a concave undercut with graduated depth in the fillet by using a circular milling tool to remove material from the fillet while rotating the circular milling tool around an offset angle as the circular milling tool moves across a sweep angle. The undercut may be defined by the sweep angle and the offset angle.

In one embodiment, the sweep angle may be in the range of about 50 degrees to about 130 degrees and the offset angle may be in the range of about 10 degrees to about 30 degrees. In another embodiment, the sweep angle may be in the range of about 80 degrees to about 100 degrees. In yet another embodiment, the sweep angle θ may be about 90 degrees, plus or minus ten percent. In some embodiments, the offset angle α may be in the range of about 15 degrees to about 25 degrees. In other embodiments, the offset angle α may be about 15 degrees, plus or minus 10 percent.

What is claimed is:

1. A crankshaft comprising:
   a web; and
   a rod journal disposed adjacent to the web, the rod journal including a fillet disposed proximal to the web, the fillet including a tapered undercut, the undercut having an arc length and a width, the undercut having a concave shape with a graduated depth along the arc length and along the width,
   wherein the undercut is defined by a sweep angle and an offset angle, the offset angle is in the range of about 10 degrees to about 30 degrees.

2. The crankshaft of claim 1, wherein the sweep angle is in the range of about 50 degrees to about 130 degrees.

3. The crankshaft of claim 1, wherein the sweep angle is in the range of about 80 degrees to about 100 degrees.

4. The crankshaft of claim 1, wherein the sweep angle is about 90 degrees.

5. The crankshaft of claim 1, wherein the offset angle is in the range of about 15 degrees to about 25 degrees.

6. The crankshaft of claim 1, wherein the offset angle is about 15 degrees.

7. The crankshaft of claim 1, wherein a maximum depth of the undercut occurs at about a midpoint of the arc length of the undercut.

8. The crankshaft of claim 1, wherein the undercut extends through the fillet into the web.

9. The crankshaft of claim 1, wherein the undercut is confined to the fillet.

10. A crankshaft rotatably mounted about an X-axis in an engine, the crankshaft comprising:
- a web; and
- a rod journal disposed adjacent to the web and configured to orbit the X-axis, the rod journal having a centerline that is parallel to and spaced apart from the X-axis, the rod journal including a fillet disposed near the web, the fillet including a tapered undercut, the undercut having an arc length and a width, the undercut having a concave shape with a graduated depth along the arc length and along the width,
- wherein the undercut is defined by a sweep angle in the range of about 50 degrees to about 130 degrees, and an offset angle in the range of about 10 degrees to about 30 degrees.

11. The crankshaft of claim 10, wherein a maximum depth of the undercut occurs at about a midpoint of the arc length of the undercut.

\* \* \* \* \*